(12) United States Patent
Hosomizo (10) Patent No.: US 11,429,320 B2
(45) Date of Patent: Aug. 30, 2022

(54) INFORMATION PROCESSING APPARATUS CONFIGURED TO PERFORM PRINTING USING A GENERAL-USE PRINTING PROGRAM, NON-TRANSITORY COMPUTER-READABLE RECORDING MEDIUM AND PRINTING METHOD THEREFOR

(71) Applicant: BROTHER KOGYO KABUSHIKI KAISHA, Nagoya (JP)

(72) Inventor: Yoshito Hosomizo, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 5 days.

(21) Appl. No.: 16/747,658

(22) Filed: Jan. 21, 2020

(65) Prior Publication Data

US 2020/0249881 A1 Aug. 6, 2020

(30) Foreign Application Priority Data

Feb. 1, 2019 (JP) .............................. JP2019-017402

(51) Int. Cl.
 *G06F 3/12* (2006.01)
(52) U.S. Cl.
 CPC .......... *G06F 3/1206* (2013.01); *G06F 3/1228* (2013.01); *G06F 3/1232* (2013.01)
(58) Field of Classification Search
 CPC .... G06F 3/1205; G06F 3/1206; G06F 3/1225; G06F 3/1228; G06F 3/123; G06F 3/1232; G06F 3/1253; G06F 3/1293; H04N 1/00962; H04N 2201/0094

USPC ........................................................ 358/1.15
See application file for complete search history.

(56) References Cited

U.S. PATENT DOCUMENTS

| 2013/0201504 | A1* | 8/2013 | Miller | .................... | G06F 3/1228 |
|---|---|---|---|---|---|
| | | | | | 358/1.13 |
| 2015/0172484 | A1* | 6/2015 | Kanno | ................. | H04N 1/0097 |
| | | | | | 358/1.13 |
| 2016/0077770 | A1* | 3/2016 | Morita | .................. | G06F 3/1285 |
| | | | | | 358/1.15 |

(Continued)

FOREIGN PATENT DOCUMENTS

| JP | 2016-058041 A | 4/2016 |
|---|---|---|
| JP | 2017-134718 A | 8/2017 |
| JP | 2018-084893 A | 5/2018 |

OTHER PUBLICATIONS

International Search Report and the Written Opinion dated Mar. 17, 2020 of the International Searching Authority issued in the PCT application No. PCT/JP2020/002924 together with English language translation.

*Primary Examiner* — Kent Yip
(74) *Attorney, Agent, or Firm* — Scully Scott Murphy and Presser (57) ABSTRACT

The supporting program, which is executable by a CPU of a PC, corresponds to a printer connected to the PC. The supporting program causes the CPU to obtain a capability value concerning a capability of the printer and provide, for a general-use printing program, information for determining a capability of the printer based on the obtained capability value. The general-use printing program provides information based on the information provided from the supporting program to an application program implemented to the PC.

14 Claims, 7 Drawing Sheets

(56) References Cited

U.S. PATENT DOCUMENTS

2017/0223210 A1    8/2017  Yamada
2018/0146110 A1\*  5/2018  Kitagawa .................. G06F 8/61

\* cited by examiner

INFORMATION PROCESSING APPARATUS CONFIGURED TO PERFORM PRINTING USING A GENERAL-USE PRINTING PROGRAM, NON-TRANSITORY COMPUTER-READABLE RECORDING MEDIUM AND PRINTING METHOD THEREFOR

CROSS-REFERENCE TO RELATED APPLICATIONS

This application claims priority under 35 U.S.C. § 119 from Japanese Patent Application No. 2019-017402 filed on Feb. 1, 2019. The entire subject matter of the application is incorporated herein by reference.

BACKGROUND

Technical Field

The technical field disclosed in the present specification relates to a non-transitory computer-readable recording medium containing instructions realizing a supporting program which supports control of a printer, an information processing apparatus and a printing method.

Related Art

There has been widely known a technique to control a printer from an information processing apparatus such as a personal computer, a configuration of installing a printer driver in the information processing apparatus, generating print data using the printer driver and transmitting the print data to the printer. The printer driver is provided by a manufacturer of the printer and is adapted to various functions the printer has, and thus can make full use of the printer.

SUMMARY

Recently, a technique of controlling a printer using a general-use printing program which is standardly implemented in an operating system (OS), without using the above-mentioned printer driver, has been in practical use. According to such a technique, upon detecting a printer, the OS associates the printer with the OS-standard general-use printing program. Thereafter, it becomes possible that, when the OS receives a print instruction corresponding to the printer, printing is executed using the OS-standard general-use printing program, without using the printer driver.

However, in the printing using the OS-standard general-use printing program, selectable setting items when selecting print parameters are only general items that are set in the OS-standard general-use printing program. Therefore, the printing using the general-use printing program is inconvenient for the user and thus there is room for improvement.

The present specification discloses a technique for improving convenience when selecting the print parameters in an information processing apparatus to which an OS-standard general-use printing program is implemented.

According to aspects of the present disclosure, there is provided a non-transitory computer-readable recording medium for an information processing apparatus. The information processing apparatus has a controller, and the recording medium containing computer-executable instructions realize a supporting program corresponding to a printer connected to the information processing apparatus. The supporting program causes, when executed by the controller, the information processing apparatus to perform a capability information obtaining process of obtaining capability information concerning a capability of the printer, and a capability determining information providing process of providing capability determining information for an general-use printing program implemented in an operating system of the information processing apparatus based on the capability information obtained in the capability information obtaining process, the capability determining information being information to determining the capability of the printer. The general-use printing program provides, for an application program implemented in the information processing apparatus, information corresponding to the capability determining information provided by the capability determining information providing process performed by the supporting program.

DETAILED DESCRIPTION OF THE EMBODIMENT

Hereinafter, referring to the accompanying drawings, a print system using programs according to the embodiment will be described in detail. The present embodiment shows a concrete example of the print system including a personal computer (hereinafter, referred to as a "PC") and a printer.

Figure 1:
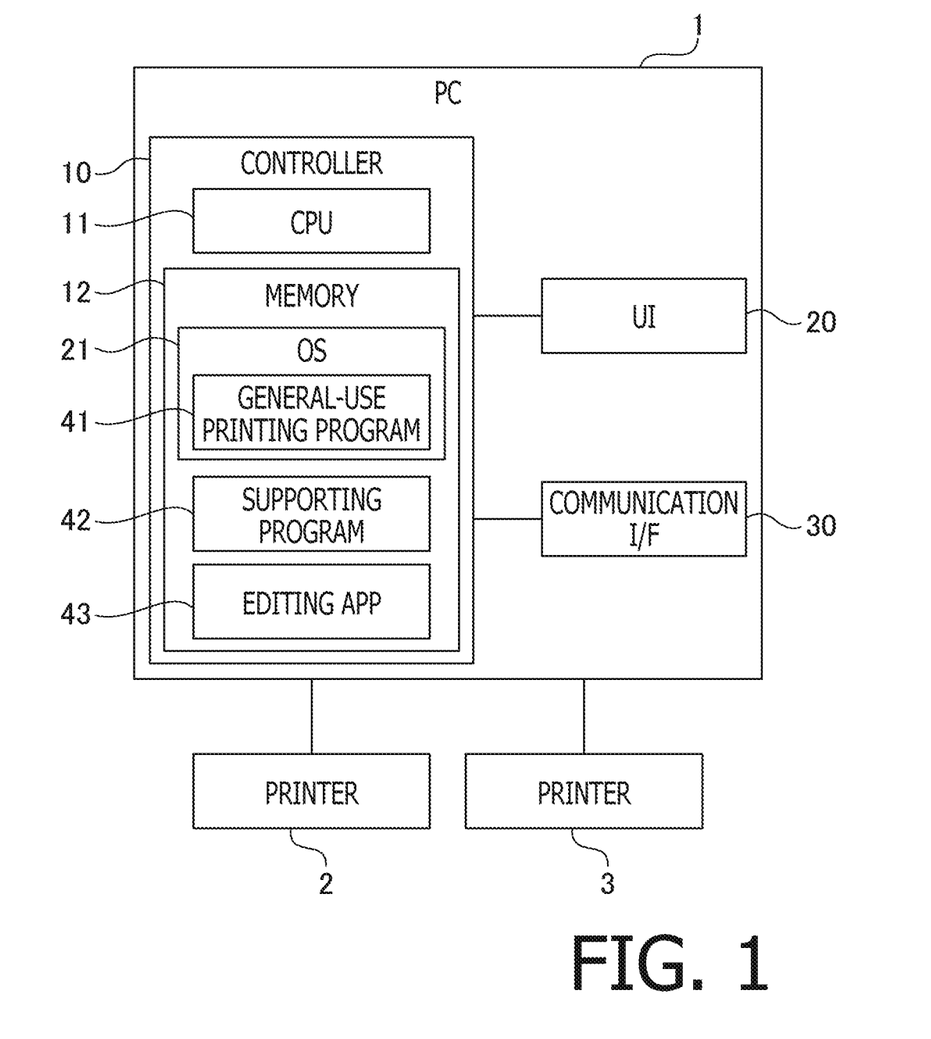
FIG. 1 is a block diagram showing an electrical configuration of a print system.

An example of a configuration of a print system in which programs according to the embodiment are executed is shown in FIG. 1. The system shown in FIG. 1 includes a PC 1, a printer 2 and a printer 3. The PC 1 is an example of an information processing apparatus. The printer 2 and the printer 3 are devices having a printing function and are configured to communicate with the PC 1 through a local communication or a network communication.

As shown in FIG. 1, the PC 1 includes a controller 10, a user interface (hereinafter, referred to as a "UI") 20 and a communication interface (hereinafter, referred to as a "communication I/F") 30. The UI 20 and the communication I/F 30 are electrically connected to the controller 10.

The UI 20 includes hardware configured to display various pieces of information and receive user's input of instructions. The UI 20 may include a touch panel having both an input receiving function and a displaying function, or a combination of a display having a displaying function and a keyboard and/or a mouse having an input receiving function.

The communication I/F 30 includes hardware configured to communicate with the printer 2 and a hardware configured to access the Internet. The communication I/F 30 may include multiple interfaces respectively employing different communication methods. Examples of the communication methods may include the network communication, a USB communication and the like. Further, the communication methods may be wired or wireless.

The controller 10 includes a CPU 11 and a memory 12. The CPU 11 is an example of a controller. The memory 12 includes a ROM, a RAM and a non-volatile memory and stores various application programs (hereinafter, referred to as "APP's") and various pieces of data. According to the present specification, details of the memories could be ignored and any memory having a suitable function could be employed as the memory 12. The CPU 11 executes various processes in accordance with programs retrieved from the memory 12 or in accordance with user's instructions. It is noted that the controller 10 in FIG. 1 is a collective name including hardware and software used to control the PC 1 and does not necessarily represent a single piece of hardware.

An example of the memory 12 may be a computer-readable storage medium. The computer-readable storage medium is a non-transitory medium. Examples of the non-transitory medium are, besides the above-described memory 12, recording mediums such as a CD-ROM, a DVD-ROM and the like. It is noted that the non-transitory medium is also a tangible medium. In contrast, an electric signal carrying a program, which is being downloaded from a server on the Internet, is a signal medium which is a kind of computer-readable media, but not included in the non-transitory computer-readable medium.

The memory 12 stores, as shown in FIG. 1, the OS 21 implemented with a general-use printing program 41, a supporting program 42 and an editing APP 43. The supporting program 42 is an example of a supporting program. The supporting program 42 is, for example, a hardware support APP (abbreviated as HSA) of which specification is published by Microsoft Corporation. The OS 21 is, for example, Microsoft Windows®, MacOS® or Linux®. It is noted that, in the memory 12, in addition to the data/APP shown in FIG. 1, various pieces of data including information regarding connected device, various programs of browser and the like are stored.

The general-use printing program 41 is an APP to cause various printers such as the printer 2 to execute printing from the PC 1 and is an OS-standard printing program which is implemented in the OS 21 in advance. The general-use printing program 41 according to the present embodiment is configured to generate print data the printer can use for printing based on image data subjected to be printed. The general-use printing program 41 is an example of a printing program.

The general-use printing program 41 is a general-purpose APP which can be used for any of a plurality of models of printers supplied by various printer venders. The general-use printing program 41 is configured to cause any of the plurality of models of printers to perform operations which are commonly implemented in the plurality of models of printers. Alternatively, the general-use printing program 41 may be a program supplied from the printer venders to a vender of the OS 21 (e.g., the program may be a kind of printer driver, which is supplied by a printer vender, to be implemented in the OS 21 in advance) so that the general-use printing program 41 is implemented in the OS 21 in advance.

The supporting program 42 is a program which executes processes based on the instruction by the OS 21 in association with the startup of the general-use printing program 41 and an APP which supports controlling of hardware subjected to the instruction. The supporting program 42 is started, for example, by the general-use printing program 41. The supporting program 42 is a program that is prepared by printer venders, such as a vender of the printer 2, for each type of printers. For example, a supporting program 42 for inkjet printers and a supporting program 42 for laser printers are prepared. The supporting program 42 may be prepared not only for each type of printers but also for each model or for each model series of printers.

The vender of the printer registers the supporting program 42 with a platform supplied by the vender of the OS 21 in accordance with a procedure designated by the vender of the OS 21. When a printer 2 is newly connected to the PC 1 and the supporting program 42 corresponding to the printer 2 is registered with the platform, the OS 21 downloads the supporting program 42 from a sever in which the supporting program 42 is stored and implements the same in the PC 1.

Then, the OS 21 associates identification information of the implemented supporting program 42 with the printer information of the newly connected printer 2 and stores the same in the memory 12. In the PC 1 to which a plurality of models of printers are connected, a plurality of supporting programs respectively corresponding to a plurality of types of the plurality of models are implemented in the OS 21, and information associating the plurality of printers with the plurality of supporting programs is stored in the memory 12. That is, in the memory 12, as the printer information for each of the printers connected to the PC 1, information on the supporting program 42 corresponding to each printer is stored in addition to the model information and the access information of each printer.

The editing APP 43 is, for example, an APP for generating and/or editing image data and document data. Examples of the editing APP 43 are Microsoft Word® and Power Point®. Further, the editing APP 43 may be an APP provided by the vender of the printer 2 and/or printer 3. The editing APP 43 is configured to receive a user operation including an instruction to cause the printer 2 to perform a particular operation. Specifically, the editing APP 43 is configured to receive, through the UI 20, a print instruction which causes the printer 2 to execute printing.

It is noted that processes and process steps of each flowchart described below basically indicate processes of the CPU 11 in accordance with instructions described in respective programs such as the supporting program 42. That is, in the following description of the processes and steps, terms "judge," "extract," "select," "calculate," "determine," "identify," "obtain," "receive," "control" and the like are those performed by the CPU 11. It is noted that the processes by the CPU 11 include controlling of hardware using an API of the OS 21. In the following description, operations of the programs will be described with omitting the detailed description of the OS 21. That is, in the following description, a description "a program B controls hardware C" may be interpreted to "a program B uses the API of the OS 21 to control the hardware C." Further, a process of the CPU 11 in accordance with the instruction described in a program may be described in a simplified manner. For example, the name of the program is omitted and simply described such that "the CPU 11 performs." Further, a process of the CPU 11 in accordance with an instruction described in the program may be described in a simplified manner such that "the program A performs" with omitting the term "CPU."

It is noted that the term "obtain" is used to mean that a request is not necessarily be made. That is, a process of the CPU 11 to receive data without any request is included within a concept that "the CPU 11 obtains data." Further, the term "data" in the present specification is used to mean a bit array readable by a computer. Multiple pieces of data having different formats but substantially the same contents will be treated as the same data. So is the information in the present specification. It is noted that terms "request" and "instruct" represent concepts of outputting information indicating something is requested and information indicating something is instructed, respectively. It is also noted that information representing something is requested or something is instructed may be simply referred to by terms "request" or "instruct."

Further, a process of the CPU 11 to determine whether or not information A indicates an event B may be described conceptually such that "the CPU 11 determines whether event B or not based on information A." Furthermore, a process of the CPU 11 to determine whether information indicates event B or event C may be described conceptually such that "the CPU 11 determines whether event B or event C based on information A."

In the print system of the present embodiment, the general-use printing program 41 obtains information indicating capabilities of a printer from a supporting program 42 corresponding to the printer. The capabilities of a printer are print settings that the printer can handle. The capabilities are, in particular, information indicating various items that are selectable as the print parameters and information indicating options that can be set for respective items. Hereinafter, information including all the capabilities, which are settable under environment the printer is installed from among capabilities the printer can handle, will be referred to as an "capability value" of the printer. Specifically, the capability value is a list including information of all the items that are selectable as the print parameters and information of all the options that can be set for respective items. For example, in an item concerning sheet size, the information includes all the options such as "A4" and "A5" being selectable sheet sizes.

Figure 2:
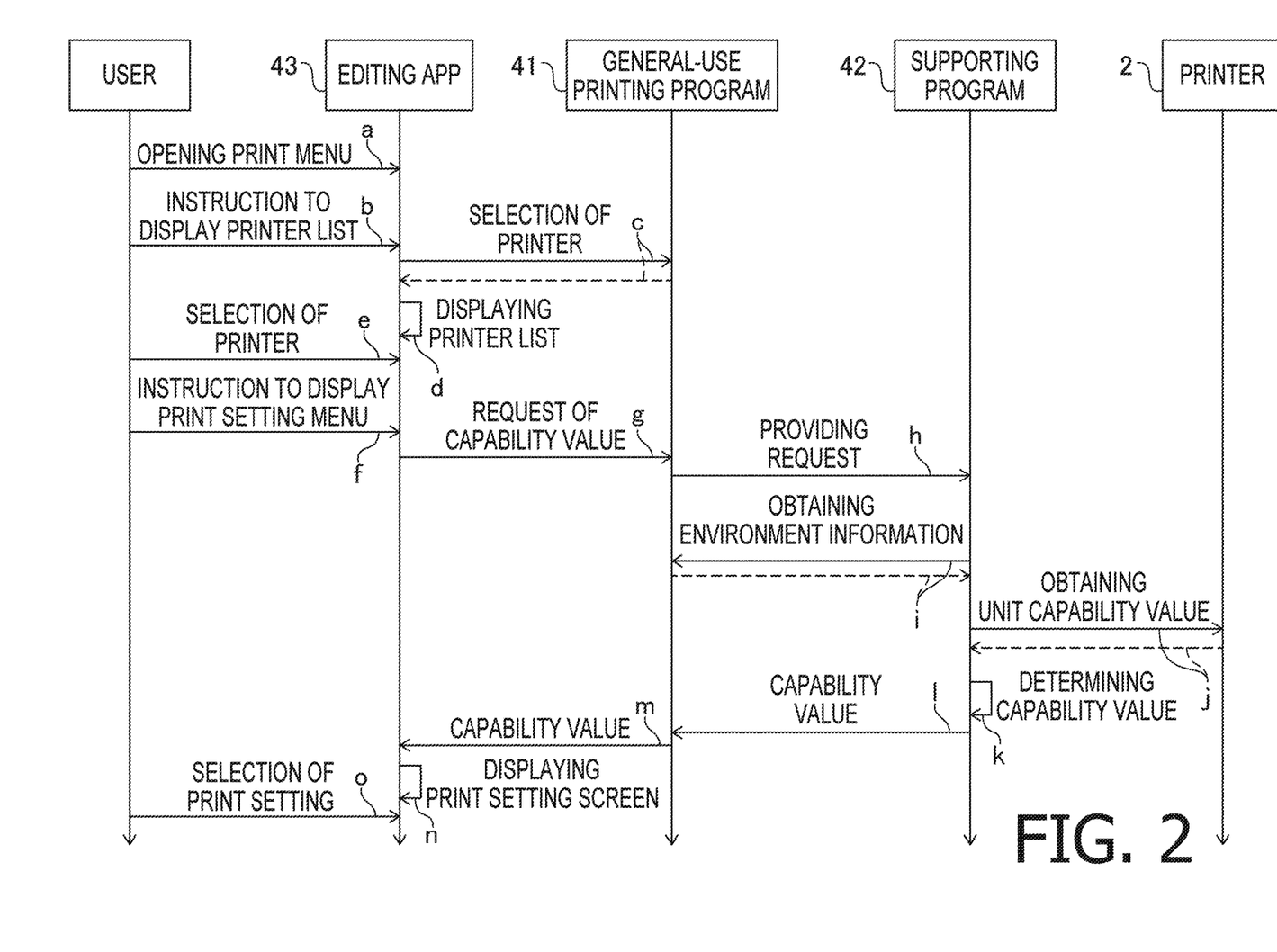
FIG. 2 is a sequential chart showing an example of a print parameter setting procedure.

An application such as the editing APP 43 which receives the print instruction receives a selection of a printer and settings of the print parameters when instructing printing using the general-use printing program 41. A procedure of operations by respective programs in case a user instruction for performing a print setting is received through the editing APP 43 or the like in the print system of the present embodiment will be described with reference to a sequential chart shown in FIG. 2. FIG. 2 indicates operations in case the user causes the printer 2 to execute printing using the general-use printing program 41 through the editing APP 43 and in case the supporting program 42 corresponding to the printer 2 is already installed in the PC 1.

The editing APP 43 receives, from the user, an instruction to open a menu concerning printing (arrow a). In the menu concerning printing, the editing APP 43 receives, for example, a selection of a printer, a selection of print settings, a selection of image data to be printed, and an instruction to execute printing. For example, when an instruction to display a list of printers for the selection of a printer is received (arrow b), the editing APP 43 obtains information of a list of selectable printers from the general-use printing program 41 (arrow c). The editing APP 43 displays a list of printers based on the obtained information (arrow d) and receives the selection of a printer (arrow e).

Upon receiving an instruction of print setting (i.e., an instruction to display a print setting screen) in a state where a printer is selected (arrow f), the editing APP 43 requests information concerning the capability value of the selected printer from the general-use printing program 41 (arrow g). If the printer of which the capability value has been requested is a printer to which the supporting program 42 is adapted, the general-use printing program 41 outputs a providing request to the supporting program 42 in response to the request from the editing APP 43 (arrow h). The providing request is information that requests the capability value of the selected printer. To the providing request, information indicating the selected printer is attached. It is noted that, if the supporting program 42 corresponding to the selected printer is not installed in the PC 1, the general-use printing program 41 delivers, to the editing APP 43, information indicating general capabilities that the general-use printing program 41 has.

The supporting program 42 has a function of determining the capability value of the selected printer and providing the capability value for the general-use printing program 41 in response to the providing request. Firstly, the supporting program 42 inquires of the general-use printing program 41 about environment information of the printer and obtains the environment information from the general-use printing program 41 (arrow i). The environment information includes, for example, information indicating a place where the printer is installed and information indicating a user who instructed to execute printing. As will be described later, the capability value of a printer may differ depending on the place where the printer is installed and the user who instructed to execute printing. The process at the arrow i is an example of an environment obtaining process. It is noted that the supporting program 42 may obtain the environment information from the selected printer or the OS 21.

The supporting program 42 further communicates with the selected printer based on the information attached to the providing request and obtains a main unit capability value indicating all the capabilities that the printer can handle (arrow j). The main unit capability value includes, for example, information concerning types of printing that the printer can execute and information concerning process units and sheet feed trays that are mounted to the printer. The main unit capability value is an example of capability information, and the process at the arrow j is an example of a capability information obtaining process.

The main unit capability value of a printer includes first capability information which the general-use printing program 41 can obtain without using the supporting program 42 and second capability information which the general-use printing program 41 cannot obtain without using the supporting program 42. Taking the sheet size as an example, sheet sizes such as sheet sizes A4 and A5 of ISO standard are included in the first capability information since a page printer is generally adapted to such sheet sizes. Whether a printer can execute printing on a large sheet such as an A3 sheet or not, existence or non-existence of additional sheet trays, and existence or non-existence of an external duplex printing unit are capabilities that depend on a model of the printer and are included in the first capability information.

The main unit capability value of a printer further includes information indicating a capability that is common in respective models and information indicating a capability that is unique to respective printer. For example, whether printing on a large sheet is possible or not is a common capability of respective models, but custom sheet sizes set in a printer and a staple function are capabilities that are unique to respective printers. The supporting program 42 can obtain the capabilities that are unique to respective printers by communicating with the selected printer in the process at the arrow j. The capabilities that are unique to respective printers are included in the second capability information. In the process at the arrow j, the supporting program 42 obtains at least capabilities included in the second capability information.

Also, the supporting program 42 may receive, from a printer, all the pieces of information included in the main unit capability value, all the pieces of information included in the second capability information, or information indicating a difference between all the capabilities of the printer and capabilities that are common in the model of the printer. In case the information indicating the difference is to be received, the supporting program 42 stores the capabilities that are common in the model of the printer in advance, and obtains the main unit capability value of the printer by using the information indicating the difference obtained from the printer. The capabilities that are common in the model of the printer may be obtained by the supporting program 42 by making an inquiry to a printer or a server of a maker of the printer, or may be stored in the supporting program 42 in advance.

Furthermore, the supporting program 42 may request, to a printer from which the main unit capability value has been obtained, update information only. In this case, the supporting program 42 stores the main unit capability value obtained from the printer in the memory 12 while adding information concerning the obtained time, and updates the stored main unit capability value based on the update information. If an elapsed time from the last update of the main unit capability value is short, the supporting program 42 need not obtain the main unit capability value. If a printer has a function of measuring sizes of sheets that are stored in the printer, the supporting program 42 may cause the printer to activate the function to obtain the sizes of the sheets that are stored in the printer.

The capability value of a printer may include capabilities to be added to the main unit capability value. For example, if the editing APP 43 is adapted to a function to which the general-use printing program 41 is not adapted, the function may be added, as a selectable capability, to the main unit capability value received from the printer. Or, if the supporting program 42 is adapted to a function to which the general-use printing program 41 is not adapted, the function may be added, as a selectable capability, to the main unit capability value received from the printer. For example, if a staple process is not adapted by the general-use printing program 41 but is adapted by the editing APP 43 and the supporting program 42, a capability to execute the staple process may be added to the main unit capability value. Added capabilities are included in the selectable print parameters.

The supporting program 42 determines the capability value to be provided for the general-use printing program 41 based on the main unit capability value obtained from the printer, the environment information obtained from the general-use printing program 41, and the information for respective models stored in itself (arrow k). Details of the process for the determination of the capability value of a printer will be described later.

The supporting program 42 provides information based on the determined capability value for the general-use printing program 41 (arrow l). The process at the arrow l is an example of a capability determining information providing process, and the information (i.e., the capability value) that is provided to the general-use printing program 41 at the arrow l is an example of capability determining information.

The supporting program 42 may provide all the information included in the determined capability value for the general-use printing program 41, or may extract and provide, for the general-use printing program 41, information indicating a difference between all capabilities of the printer 2 and the general capabilities the general-use printing program 41 has. That is, the supporting program 42 may provide the capabilities included in the above-mentioned second capability information. The extracted difference includes, for example, capabilities that are unique to a model of a printer, individual capabilities that the printer has, and capabilities that are excluded due to the environment information or the like. In this case, information indicating the difference is an example of the capability determining information.

The general-use printing program 41 delivers the provided capability value for the editing APP 43 which has requested the capability value (arrow m). The editing APP 43 determines pieces of information to be displayed as items in the print setting screen and options in respective items by using information in the received capability value and displays the print setting screen on the UI 20 (arrow n). Then, the editing APP 43 receives a selection of print settings by the user through the displayed print setting screen (arrow o).

Figure 3:
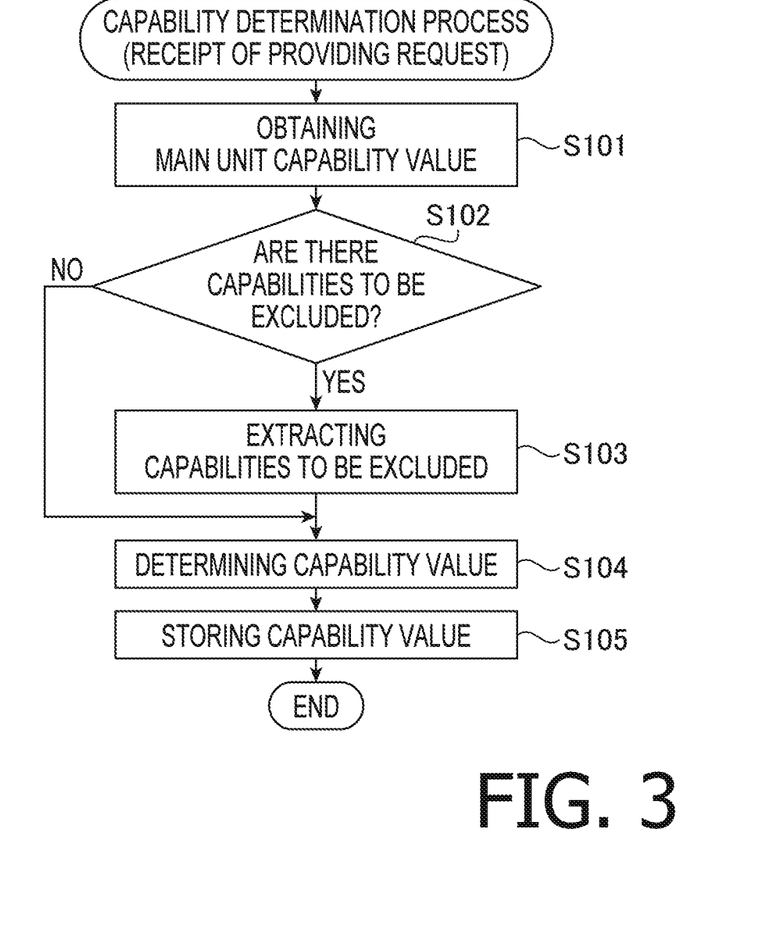
FIG. 3 is a flowchart showing a procedure of a capability determination process.

Next, a procedure of a capability determination process for realizing the operation of the supporting program 42 to determine the capability value in response to the request from the general-use printing program 41 when the capability value of a printer is requested through an application such as the editing APP 43 in the print system of the present embodiment will be described with reference to a flowchart shown in FIG. 3. This capability determination process is a process that is to be executed at the arrow k shown in FIG. 2, and is executed by the CPU 11 of the PC 1 in accordance with the supporting program 42 upon receiving a capability providing request from the general-use printing program 41.

In the capability determination process, the CPU 11 obtains information indicating all the capabilities (i.e., the main unit capability value) that the printer can execute based on the information obtained at the arrow j shown in FIG. 2 (S101). The main unit capability value includes capabilities unique to the printer. For example, functions that the printer does not have are not included in the main unit capability value. Then, the CPU 11 determines whether there are capabilities to be excluded from the main unit capability value in accordance with the environment information obtained at the arrow i shown in FIG. 2 (S102). For example, the capabilities to be excluded are capabilities inadequate for environment indicated by the environment information.

Figure 4A:
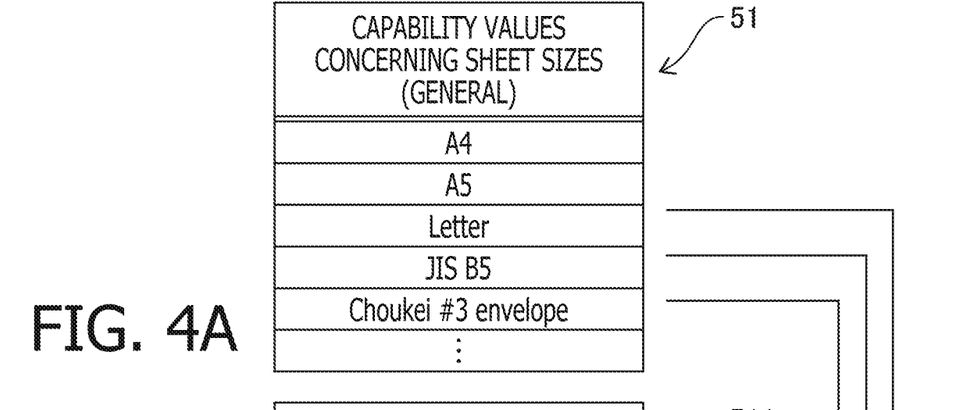
FIGS. 4A, 4B, 4C, 4D are drawings showing examples of capability values.

For example, based on the environment information, the supporting program 42 excludes sheet sizes that are less likely to be used from the main unit capability value. Examples of variations of capability values concerning sheet sizes in the capability values is shown in FIG. 4. For example, as shown in FIG. 4(A), capability values 51 indicating the abilities concerning the sheet sizes for page printers include a plurality of sizes used in various regions, including sheet sizes in A series of the ISO standard, sheet sizes in B series of the JIS standard and the letter size. It is noted that the ability values 51 shown in FIG. 4(A) are merely examples. The capability values 51 may include unique sizes that are used only in specific regions.

Figure 4B:
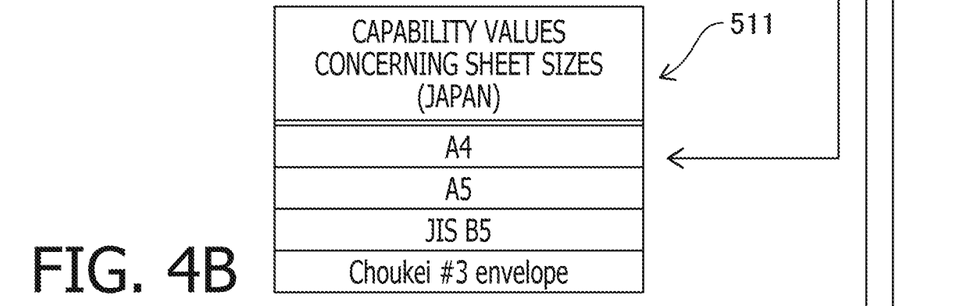
Figure 4C:
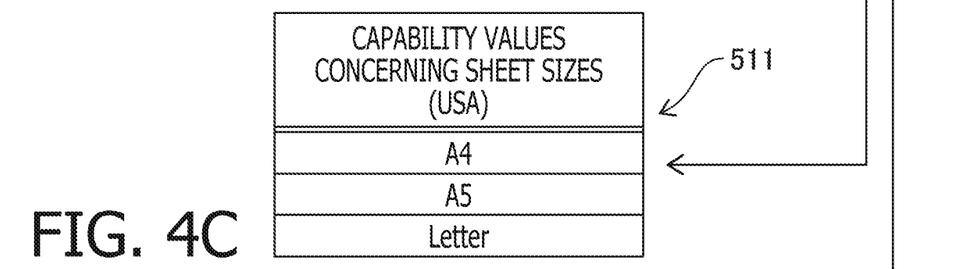

For example, since, in Japan, it is very unlikely that the letter size is selected as the sheet size, the supporting program 42 excludes the letter size from capabilities of a printer of which the installed place is in Japan and changes the capability value to, for example, a capability value 511 shown in FIG. 4(B). On the other hand, in case of a printer of which the installed place is in the US, the supporting program 42 excludes, from the capability value 51, sizes that are used only in specific regions such as the sheet sizes in column B of the JIS standard and sizes that are unique in Japan such as "Choukei (long) #3 envelope" and, for example, changes the capability value to a capability value 511 shown in FIG. 4(C).

Figure 4D:
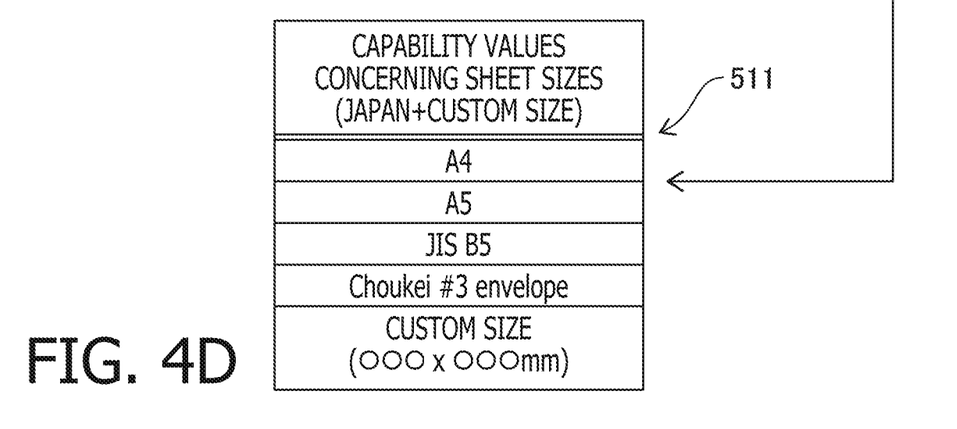

If a printer is installed in Japan and a custom size is set in the printer, for example, as shown in FIG. 4(D), the supporting program 42 changes the capability value to a capability value 511 including the set custom size.

Also, for example, the supporting program 42 may receive settings regarding usage restrictions for respective users. In this case, for example, the supporting program 42 obtains user's attribute information from the OS 21 based on the environment information obtained at the arrow i shown in FIG. 2. Further, the supporting program 42 transmits the user's attribute information to the printer and obtains restriction information of the user from the printer at the arrow j shown in FIG. 2. The supporting program 42 may store the restriction information of the user in the memory 12. Then, if a capability of which usage by the user is restricted is included in the main unit capability value, the supporting program 42 excludes information concerning the capability from the capability value. With this configuration, for example, usage of high quality papers and execution of color printing by a particular user can be restricted.

If it is determined that there is information concerning a capability to be excluded from the capability value (S102: YES), the CPU 11 extracts the information concerning the capability to be excluded (S103). S103 is an example of an extracting process. If it is determined that there is no information concerning capability to be excluded from the capability value (S102: NO), or after S103, the CPU 11 determines only the capabilities that are not excluded are to be included in the capability value of the printer (S104). The CPU 11 further stores the determined capability value in the memory 12 (S105) and terminates the capability determination process.

It is noted that, in place of determining the capability value of a printer when a request for the capability value of the printer is received, the supporting program 42 may determine capability values of respective printers and store the capability values in the memory 12 in advance, and may read out the capability value of a selected printer from the memory 12 in response to a request from the general-use printing program 41.

For example, if a new printer is connected to the PC 1 but the supporting program 42 corresponding to the printer is not installed in the PC 1, the OS 21 executes processes for installing the supporting program 42. Then, the installed supporting program 42 may determine the capability value of the corresponding printer when executing printing or the like for the first time and may store the capability value in the memory 12.

If a new printer corresponding to the installed supporting program 42 is added to the print system, the supporting program 42 may obtain information of the added printer from the OS 21 to determine the capability value of the added printer. For example, if a new printer is connected to the PC 1, the supporting program 42 may determine the capability value of the new printer and store the capability value in the memory 12 at a predetermined timing such as when the PC 1 is activated or when an execution instruction is received from a user.

As described above, the supporting program 42 provides the determined capability value for the general-use printing program 41 (arrow l shown in FIG. 2) and the general-use printing program 41 provides the capability value for the editing APP 43 (arrow m shown in FIG. 2). Then, the print setting screen in accordance with the capability value is displayed on the UI 20 (arrow n shown in FIG. 2). In the print setting screen, capabilities that are determined in the capability determination process are displayed as selectable print parameters.

Figure 5:
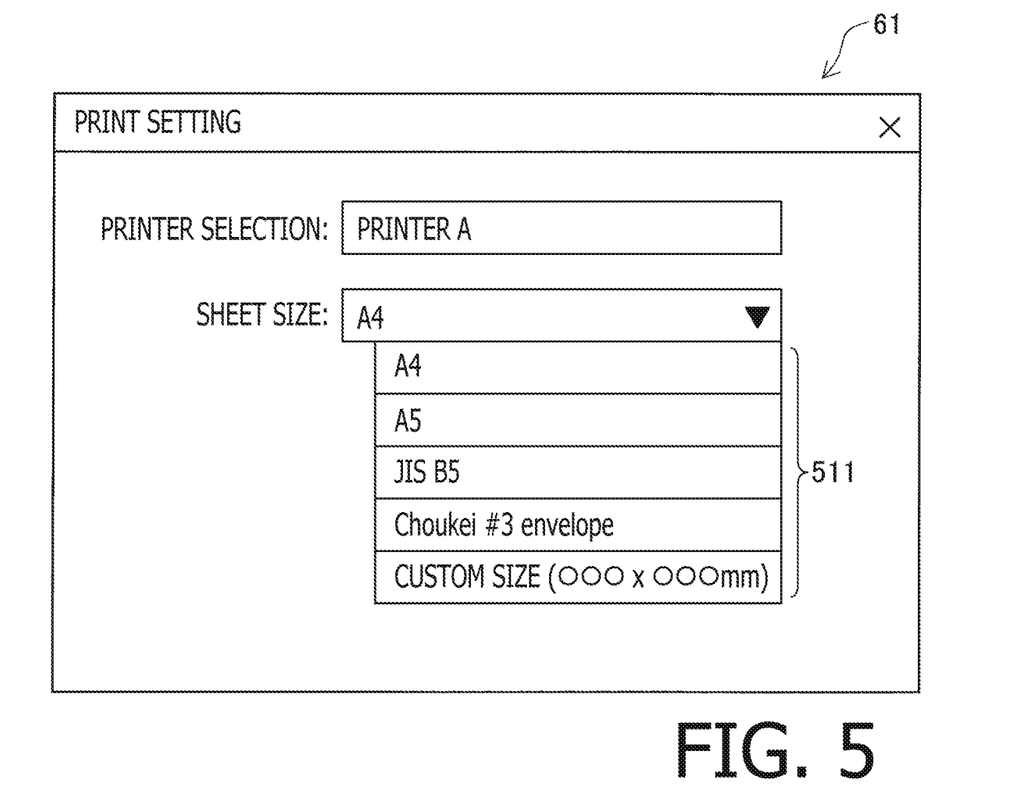
FIG. 5 is a drawing showing an example of a print setting screen.

For example, if the capability value 511 shown in FIG. 4(D) is determined as the capability value by the supporting program 42, as shown in FIG. 5, the editing APP 43 displays, in a sheet size setting screen 61, a custom size as an option of the sheet size. By the editing APP 43 displaying the custom size as an option of the sheet size, the user can select the custom size. Also, for example, if an additional sheet feed tray is mounted to the printer, since the capability value including information concerning the additional sheet feed tray will be provided for the editing APP 43, the editing APP 43 can display the additional sheet feed tray in the setting screen 61 as an option of the sheet tray and receive a selection of the additional sheet feed tray.

Based on the capability value determined by the supporting program 42, the editing APP 43 displays capabilities included in the capability value as selectable items. On the other hand, since capabilities that are not included in the capability value cannot be selected, the editing APP 43 may not display such capabilities as items and may determine some of the print parameters based on the capability value. For example, if the color printing is included in the capability value, the editing APP 43 displays the color printing and the monochromatic printing as selectable items and receives the user's selection. On the other hand, if the color printing is not included in the capability value, the editing APP 43 does not display the color printing and the monochromatic printing as selectable items and set the print setting to the monochromatic printing. Or, in place of displaying the color printing and the monochromatic printing as selectable items, the editing APP 43 may display characters of "monochromatic printing".

Next, a configuration of the supporting program 42 and a printing procedure including processes based on the supporting programs 42 of the present embodiment will be generally described with reference to a sequential chart shown in FIG. 6. The supporting program 42 is a program that the general-use printing program 41 instructs to execute when a print instruction to execute printing using the general-use printing program 41 is received through the editing APP 43 or the like in a state where a printer corresponding to the supporting program 42 is designated. In the following description, a case where the PC 1 receives, through the UI 20 (e.g., with the editing APP 43), an instruction to execute printing with the printer 2 through the general-use printing program 41 in a state where image data subjected to be printed is designated and the supporting program 42 corresponding to a type of a model of the printer 2 is implemented in the PC 1 will be described.

Firstly, the editing APP 43 receives, through the UI 20, designation of an image subjected to be printed and an input of an instruction to execute printing (arrow A). An image that the editing APP 43 displays is an example of an image subjected to be printed. The editing APP 43 displays, for example, documents edited with the editing APP 43 or pictures and the like read with the editing APP 43 as the image. Then, the editing APP 43 which received the print instruction delivers a print execution notification indicating contents of received print instruction to the OS 21. It is noted that, in FIG. 6, operations of the OS 21 are omitted.

When the print execution notification indicating usage of the general-use printing program 41 is received, the OS 21 activates the general-use printing program 41 and delivers the print execution notification to the general-use printing program 41 (arrow B). The general-use printing program 41 can obtain, from the print execution notification, various pieces of information included in the print instruction such as information indicating a printer to be caused to execute printing, information indicating print parameters set with the APP, information indicating image data subjected to be printed, and information for identifying a user who instructed to execute printing. It is noted that, as will be described later, these pieces of information are used in the supporting program 42 as well.

The general-use printing program 41 generates intermediate image data by converting a format of the image data included in the print execution notification to a format of the intermediate image data and generates a print job including the intermediate image data (arrow C). There are various types of image data as the image data included in the editing APP 43, and the general-use printing program 41 converts the received image data to the intermediate image data that is suitable for the generation of the print data. It is noted that, if the image data included in the print execution notification is suitable for the generation of the print data, the generation of the intermediate image data may be omitted and the image data may be directly used as the intermediate image data. The intermediate image data is, for example, XPS format data.

Further, the general-use printing program 41 identifies, based on the information included in the print execution notification, a printer designated as a device to be caused to execute printing. For example, when the printer 2 is designated as the device to be caused to execute printing, the general-use printing program 41 identifies the model of the printer 2 based on the model information of the printer included in the printer information stored in the memory 12. Then, since the supporting program 42 corresponding to the printer 2 designated by the print instruction is stored in the memory 12, the general-use printing program 41 outputs an execution command for causing the supporting program 42 to execute processes to activate the supporting program 42 before the general-use printing program starts generation of print data. That is, in response to the detection of the print execution notification by the general-use printing program 41, the execution command is output from the general-use printing program 41 to the supporting program 42.

After the generation of the intermediate image data and before starting generation of the print data, the general-use printing program 41 outputs an execution command for causing the supporting program 42 to execute processes (arrow D). To this execution command, the print parameters and the intermediate image data are attached. The supporting program 42 can handle the intermediate image data and the print parameters.

The supporting program 42 that has received the execution command from the general-use printing program 41 starts processes corresponding to the execution command (arrow H). At the arrow H, the supporting program 42 edits the intermediate image data based on the print parameters. The supporting program 42 can obtain various pieces of information included in the print instruction from the general-use printing program 41 via the execution command of the process at the arrow D.

The print parameters include general-use parameters that are used in the generation of the print data by the general-use printing program 41 and intrinsic parameters that are not used in the generation of the print data by the general-use printing program 41. The general-use parameters are, for example, parameters for setting the sheet size, a printing resolution and the color/monochromatic printing, and the intrinsic parameters are, for example, parameters for setting the staple process, an aggregation printing and addition of watermarks.

In the process at the arrow H, for example, the supporting program 42 edits the intermediate image data. For example, the supporting program 42 applies processes to an image of the intermediate image data in accordance with settings of the intrinsic parameters among the print parameters. For example, aggregation of images, division of an image, magnification/reduction of an image, and combining of an image such as a watermark correspond to the image processing. If the print parameters after the edition include only the general-use parameters, the supporting program 42 need not edit the intermediate image data.

Then, the supporting program 42 reflects the print parameters and intermediate image data after the edition to the print job, returns an end notification indicating the end of the editing process to the general-use printing program 41 along with the print job, and terminates processes related to the edition of the intermediate image data (arrow I). It is noted that the supporting program 42 may reflect the edited intermediate image data to the print job via the general-use printing program 41 by providing the edited intermediate image data for the general-use printing program 41.

In response to receiving the end notification from the supporting program 42, the general-use printing program 41 generates the print data based on the intermediate image data (arrow J). The intermediate image data for generating the print data may be edited in the process at the arrow H. The general-use printing program 41 generates the print data by using the general-use parameters among the print parameters. The print data generated by the general-use printing program 41 is print data of a format that can be used in printing with various types of printers. The print data is, for example, PWG Raster data or PDF data.

After the generation of the print data, the general-use printing program 41 outputs an execution command for causing the supporting program 42 to execute processes (arrow K). To the execution command at the arrow K, the print parameters and the print data are attached.

The supporting program 42 which received the execution command from the general-use printing program 41 starts a print data editing process (arrow L). The supporting program 42 can obtain the generated print data, in addition to the print parameters and information concerning a printer, from the general-use printing program 41 via the execution command of the process at the arrow K.

In the editing process at the arrow L, for example, the supporting program 42 adds, to the print data, commands for causing the printer 2 to execute functions unique to the printer 2. The functions unique to the printer 2 are, for example, a toner save function and a finisher function (e.g., staple function). If the printer 2 has functions of adding watermarks, header/footer and the like to an image by itself, the supporting program 42 may add commands for causing the printer 2 to execute these functions to the print data.

Then, the supporting program 42 reflects the edited print data to the print job, returns an end notification indicating the end of the editing process to the general-use printing program 41 along with the print job, and terminates processes related to the edition of the print data (arrow M). The supporting program 42 may reflect the edited print data to the print job via the general-use printing program 41 by providing the edited print data for the general-use printing program 41.

The general-use printing program 41 transmits a print command to the printer 2 in response to receiving the end notification from the supporting program 42 (arrow N). Then, the printer 2 which received the print command executes printing of the image in the print data in accordance with the print data attached to the print command. When print data to which a command is attached is received, the printer 2 performs operations indicated by the command when executing printing. It is noted that the supporting program 42 may transmit the print command to the printer 2 through the communication I/F 30 without using the general-use printing program 41. In this case, the supporting program 42 may convert the print data to a data format different from the above-mentioned data formats and transmit the converted print data.

Next, a procedure of an intermediate image data editing process for realizing the operation for editing the intermediate image data that is executed at the arrow H shown in FIG. 6 will be described with reference to a flowchart shown in FIG. 7. This intermediate image data editing process is executed by the CPU 11 of the PC 1 in accordance with the supporting program 42 upon receiving the execution command from the general-use printing program 41. The intermediate image data editing process is a process executed before the generation of the print data by the general-use printing program 41.

In the intermediate image data editing process, the CPU 11 obtains the print parameters (S201). The print parameters include the general-use parameters and the intrinsic parameters. The print parameters to be obtained at S201 are print parameters that are selected by the user from the capabilities included in the capability value determined in the capability determination process. Then, the CPU 11 determines whether parameters that can be dealt by editing the intermediate image data are included in the print parameters obtained at S201 or not (S203).

If it is determined that the print parameters include parameters that can be dealt by editing the intermediate image data (S203: YES), the CPU 11 processes the intermediate image data (S204). After S204, or if it is determined that the print parameters do not include parameters that can be dealt by editing the intermediate image data (S203: NO), the CPU 11 notifies the general-use printing program 41 that the intermediate image data editing process is terminated and terminates the intermediate image data editing process.

Figure 6:
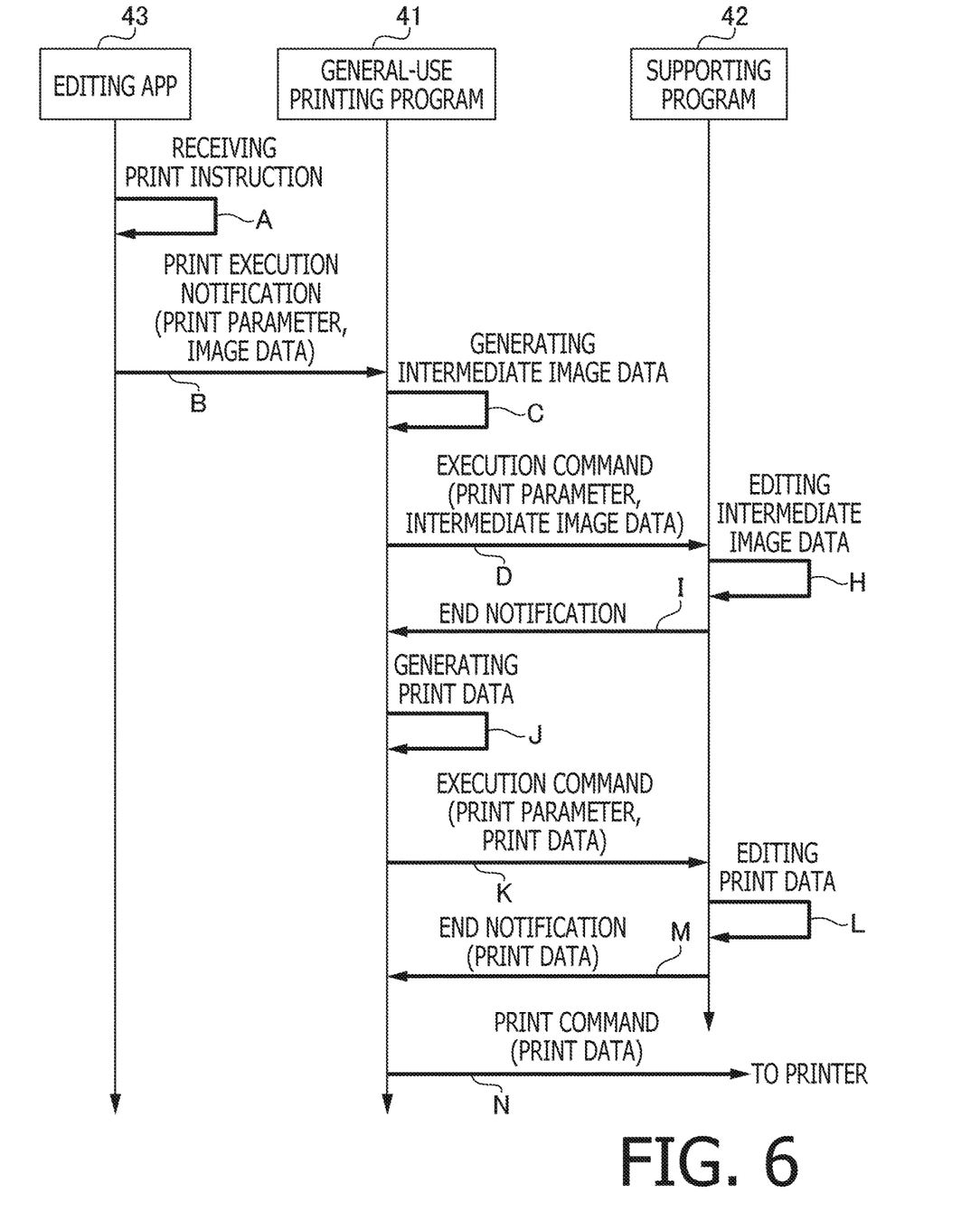
FIG. 6 is a sequential chart showing an example of an order of operations by respective programs.
Figure 7:
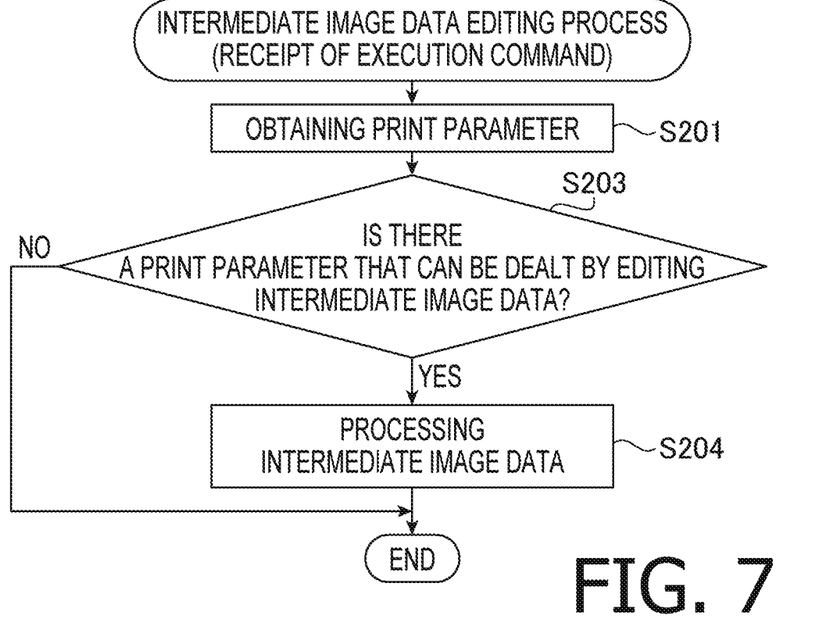
FIG. 7 is a flowchart showing a procedure of an intermediate image data editing process.

It is noted that, if print parameters that can be dealt by editing the print data is included, the supporting program 42 edits the print data in the print data editing process executed at the arrow L shown in FIG. 6. In this case, the supporting program 42 executes the print data editing process based on the execution command from the general-use printing program 41. A procedure of the print data editing process will be described with reference to a flow chart shown in FIG. 8. This print data editing process is executed in the CPU 11 of the PC 1 in accordance with the supporting program 42 upon receiving the execution command from the general-use printing program 41. The print data editing process is a process that is executed after the generation of the print data by the general-use printing program 41.

Figure 8:
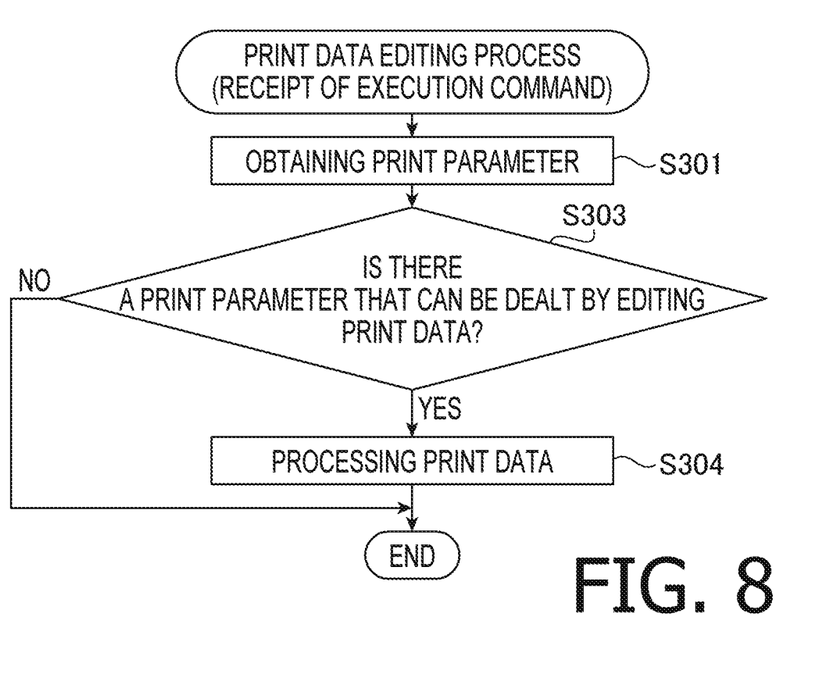
FIG. 8 is a flowchart showing a procedure of a print data editing process.

In the print data editing process, the CPU 11 obtains the print parameters from the general-use printing program 41 (S301). The print parameters include the general-use parameters and the intrinsic parameters. The print parameters to be obtained at S301 are print parameters that are selected by the user from the capabilities included in the capability value determined in the capability determination process. Then, the CPU 11 determines whether parameters that can be dealt by editing the print data are included in the print parameters obtained at S301 or not (S303).

If it is determined that the print parameters include parameters that can be dealt by editing the print data (S303: YES), the CPU 11 processes the print data (S304). After S304, or if it is determined that the print parameters do not include parameters that can be dealt by editing the print data (S303: NO), the CPU 11 notifies the general-use printing program 41 that the print data editing process is terminated and terminates the print data editing process.

For example, if the custom size is included in the print parameters, in the intermediate image data editing process or in the print data editing process, the supporting program 42 processes the intermediate image data or the print data such that a resolution of an image indicated by the data is adapted to the custom size. That is, if a print parameter which cannot be handled by the general-use printing program 41 but can be dealt by editing the intermediate image data or the print data is set, the supporting program 42 executes edition in accordance with the set print parameters in the intermediate image data editing process or the print data editing process.

As described above in detail, the supporting program 42 of the present embodiment provides information indicating the capability value of a printer in response to a request from the general-use printing program 41. By this configuration, for example, when letting the user to select the print parameters through the editing APP 43 or the like, not only general printer capabilities that the general-use printing program 41 has but also information that the supporting program 42 has can be reflected to options of the print parameters. Therefore, it becomes possible for the user to select, for example, custom capabilities for respective models of printers, thereby increasing freedom in the selection of the print parameters and making it possible to make printers fully exert their capabilities.

Furthermore, in the present embodiment, if there is a request for the capability value from an application such as the editing APP 43, the general-use printing program 41 requests the capability value from the supporting program 42 and the supporting program 42 provides the capability value. Since the application receives a selection of the print parameters from options being based on the provided capability value, a selection of capabilities appropriate for a printer which executes printing becomes possible.

Since the supporting program 42 of the present embodiment inquires capabilities to printers directly, the supporting program 42 can provide information concerning capabilities that are currently set in respective printers for the editing APP 43. Timings for inquiring capabilities to printers may be each time there is a request for the capability value, when installing the supporting programs 42 or printers, or arbitrary timings the user desires.

Since the supporting program 42 of the present embodiment provides information other than information concerning the general capabilities the general-use printing program 41 has, the user can use capabilities unique to respective printers through the editing APP 43.

Since the supporting program 42 of the present embodiment excludes capabilities that are very unlikely to be selected from the capability value to be provided depending on usage environments, the excluded capabilities are excluded from the options selectable in the editing APP 43 or the like. Therefore, options that are presented by the editing APP 43 only include options that are likely to be selected, and thus it becomes easier for the user to set the print parameters.

It is noted that the embodiment disclosed in the present specification is only an illustrative examples and is not intended to limit aspects of the present disclosures. Accordingly, the technique disclosed in the present specification can be modified or enhanced without departing from aspects of the disclosures. For example, the device connected to the PC 1 need not be limited to the printer but may be any device which has a printing function (e.g., an MFP, a copier, a facsimile machine and the like). Further, the number of printers connected to the PC 1 need not be limited to that in the illustrated example but may be one or three or more.

In the present embodiment, the supporting program 42 stores the determined capability value in the memory 12. However, the capability value need not be stored. For example, the supporting program 42 may determine the capability value each time the request is received. However, if the determined capability value is stored, it may be possible to shorten a time period required to provide the capability value since the receipt of the request for the capability value.

In the present embodiment, the supporting program 42 executes both the addition and exclusion of the capability values. However, only one of them may be executed. For example, the supporting program 42 may only execute an addition of information indicating functions unique to a printer to the general capability values.

In the embodiment, the supporting program 42 is configured to execute various processes. However, the supporting program 42 needs not have all the processes. For example, the supporting program 42 may only include the configuration for the capability determination process. Also, the program for the capability determination process, the program for the intermediate image data editing process and the program for the print data editing process may be separate programs.

A module that executes the process for the determination of the capability value is not limited to the supporting program 42. For example, the module only need to be a program that receives an instruction from the OS 21 when executing printing using the general-use printing program 41 of the OS 21. For example, the module may be Print workflow of which specification is disclosed by Microsoft.

In the embodiment, as operations of the supporting program 42, only the operations concerning the determination of the capability value and the setting of the print parameters are described. However, the supporting program 42 may further have other roles.

In the embodiment, the supporting program 42 is executed in response to the execution command of the supporting program 42 outputting from the general-use printing program 41. However, the execution timing of the supporting program 42 is not limited to the above. For example, the supporting program 42 may be executed in response to a direct execution instruction from the OS 21 or may be a resident program. If the supporting program 42 is a resident program, the supporting program 42 may execute the aforementioned operations upon receiving execution commands.

In any of the flowcharts disclosed in the embodiment, the order of multiple processes at arbitrary multiple steps may be changed arbitrarily or may be executed in parallel unless there occurs conflicts in processing contents.

The processes disclosed in the present embodiment may be executed by a single CPU, a plurality of CPUs, hardware such as an ASIC or a combination thereof. Further, the processes disclosed in the present embodiment may be realized by various modes such as a non-transitory recording medium storing programs for executing the processes, methods for executing the processes and the like.

What is claimed is:

1. A non-transitory computer-readable recording medium for an information processing apparatus, the information processing apparatus having a controller, the recording medium containing computer-executable instructions realizing a supporting program corresponding to a printer connected to the information processing apparatus, the supporting program causing, when executed by the controller, the information processing apparatus to perform:

obtaining second capability information concerning a capability of the printer; and providing capability determining information to a general-use printing program implemented in an operating system of the information processing apparatus based on the second capability information, the capability determining information being information to determine the capability of the printer, the general-use printing program generating a print job without using a printer driver and the general-use printing program obtains first capability information concerning a capability of the printer without through the supporting program, the second capability information being not included in the first capability information, wherein the general-use printing program provides, to an application program implemented in the information processing apparatus, information corresponding to the capability determining information provided by the supporting program and information corresponding to the first capability information.

2. The non-transitory computer-readable recording medium according to claim 1, wherein the supporting program causes, when executed by the controller, the information processing apparatus to obtain the second capability information when receiving a providing request from the general-use printing program, the general-use printing program inputting the providing request to the supporting program upon receiving an inquiry of a capability of the printer from the application program.

3. The non-transitory computer-readable recording medium according to claim 2, wherein the general-use printing program provides, to the application program, the information corresponding to the capability determining information provided by the supporting program and the information corresponding to the first capability information, obtains a print parameter which the application program receives a selection based on the provided information, and generates print data based on the print parameter.

4. The non-transitory computer-readable recording medium according to claim 2, wherein, the supporting program causes, when executed by the controller, the information processing apparatus to transmit an inquiring command of a capability to the printer through a communication interface of the information processing apparatus, and obtain the second capability information by receiving the second capability information output from the printer in response to the inquiring command.

5. The non-transitory computer-readable recording medium according to claim 1,
wherein the first capability information is information indicating a capability which is common in a model of a plurality of printers, and
wherein the second capability information is information indicating a capability which is unique to a printer.

6. The non-transitory computer-readable recording medium according to claim 1,
wherein the supporting program causes, when executed by the controller, the information processing apparatus to perform:
obtaining environment information from the operating system, the environment information being information indicating environment of the information processing apparatus; and
extracting, from the second capability information, a capability inadequate for environment indicated by the environment information obtained,
wherein, the supporting program causes, when executed by the controller, the information processing apparatus to exclude from the capability determining information, information indicating a capability extracted.

7. The non-transitory computer-readable recording medium according to claim 6,
wherein the supporting program causes, when executed by the controller, the information processing apparatus to perform:
obtaining user's attribute information from the operating system based on the environment information, the user's attribute information indicating attribute of a user who instructs printing with the printer;
obtaining restriction information of the user from the printer based on the user's attribute information; and
excluding, from the second capability information, a capability restricted by the restriction information.

8. The non-transitory computer-readable recording medium according to claim 1,
wherein the capability determining information includes information indicating a sheet size adapted to the printer.

9. The non-transitory computer-readable recording medium according to claim 1,
wherein the capability determining information includes information indicating a sheet feed tray adapted to the printer.

10. The non-transitory computer-readable recording medium according to claim 1,
wherein the supporting program causes, when executed by the controller, the information processing apparatus to perform an editing when the general-use printing program receives a print instruction to cause the printer to perform printing of an image, the editing comprises editing at least one of print data output from the general-use printing program or intermediate print data used for generating the print data.

11. An information processing apparatus comprising:
a memory configured to store
a general-use printing program which is implemented in an operating system of the information processing apparatus, the general-use printing program generating a print job without using a printer driver,
a supporting program and an application program which are implemented in the information processing apparatus, the supporting program corresponding to a printer connected to the information processing apparatus, the application program being configured to receive a print instruction to cause the printer to print an image using the general-use printing program; and
a controller configured to:
obtain first capability information using the general-use printing program without through the supporting program, the first capability information being information concerning a capability of the printer;
obtain second capability information using the supporting program, the second capability information being information concerning a capability of the printer, the second capability information being not included in the first capability information; and
provide capability determining information, using the supporting program, to the general-use printing program based on the second capability information, the capability determining information being information to determine a capability of the printer,
wherein the general-use printing program provides, to the application program, information corresponding to the capability determining information provided by the supporting program and information corresponding to the first capability information.

12. The information processing apparatus according to claim 11,
wherein the controller obtains the second capability information when receiving a providing request from the general-use printing program, the general-use printing program inputting the providing request to the supporting program upon receiving an inquiry of a capability of the printer from the application program.

13. The information processing apparatus according to claim 12,
wherein the general-use printing program provides, to the application program, the information corresponding to the capability determining information provided by the supporting program and the information corresponding to the first capability information, obtains a print parameter which the application program receives a selection based on the provided information, and generates print data based on the print parameter.

14. A printing method of controlling an information processing apparatus having a controller and a memory configured to store
a general-use printing program which is implemented in an operating system of the information processing apparatus, the general-use printing program generating a print job without using a printer driver,
a supporting program and an application program which are implemented in the information processing apparatus, the supporting program corresponding to a printer connected to the information processing apparatus, the application program being configured to receive a print instruction to cause the printer to print an image using the general-use printing program,
wherein the method includes:
causing the printer to perform printing based on print data generated in the information processing apparatus;
obtaining first capability information using the general-use printing program without through the supporting program, the first capability information being information concerning a capability of the printer;

obtaining second capability information using the supporting program, the second capability information being information concerning a capability of the printer, the second capability information being not included in the first capability information;

providing capability determining information, using the supporting program, to the general-use printing program based on the obtained second capability information, the capability determining information being information to determine a capability of the printer; and providing, to the application program, using the general-use printing program, information corresponding to the provided capability determining information and information corresponding to the first capability information.

* * * * *